Nov. 23, 1965  J. P. BRUCK  3,218,710
GRASS TRIMMERS
Filed Feb. 28, 1963  2 Sheets-Sheet 1
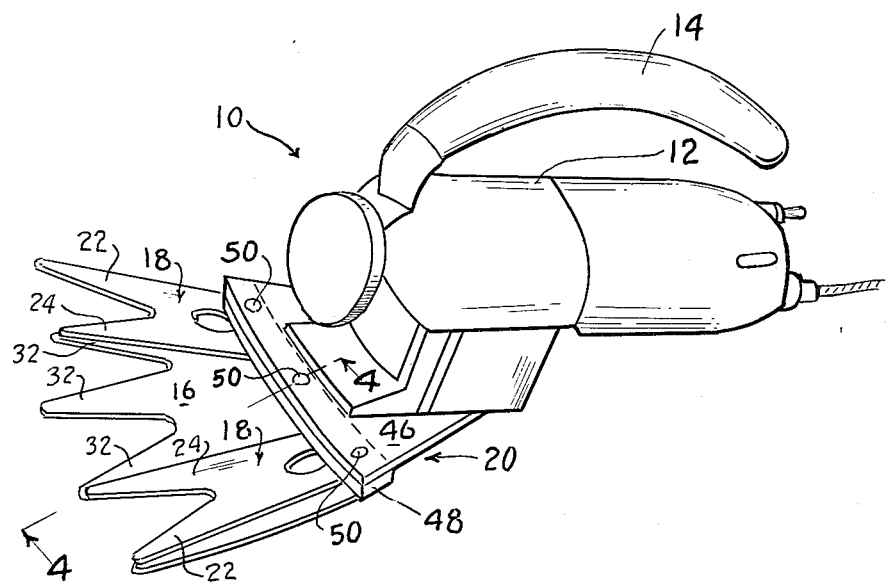
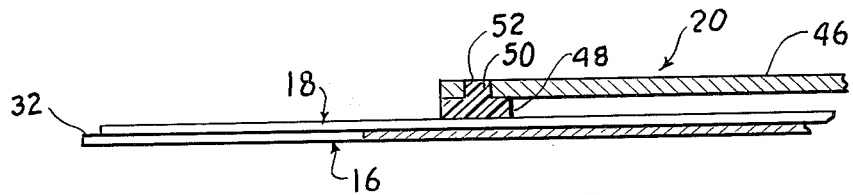
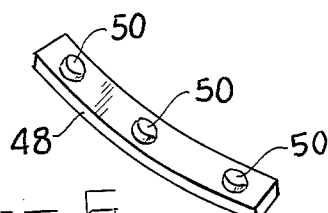
INVENTOR.
JOHN P. BRUCK
BY
ATTORNEYS Nov. 23, 1965    J. P. BRUCK    3,218,710
GRASS TRIMMERS
Filed Feb. 28, 1963    2 Sheets-Sheet 2
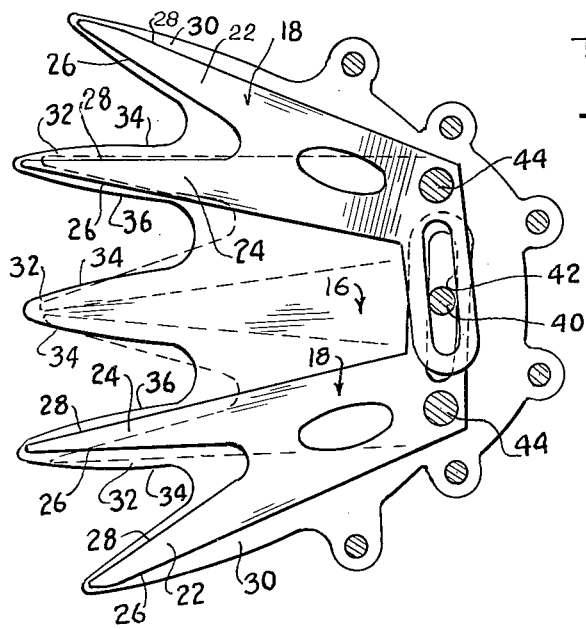
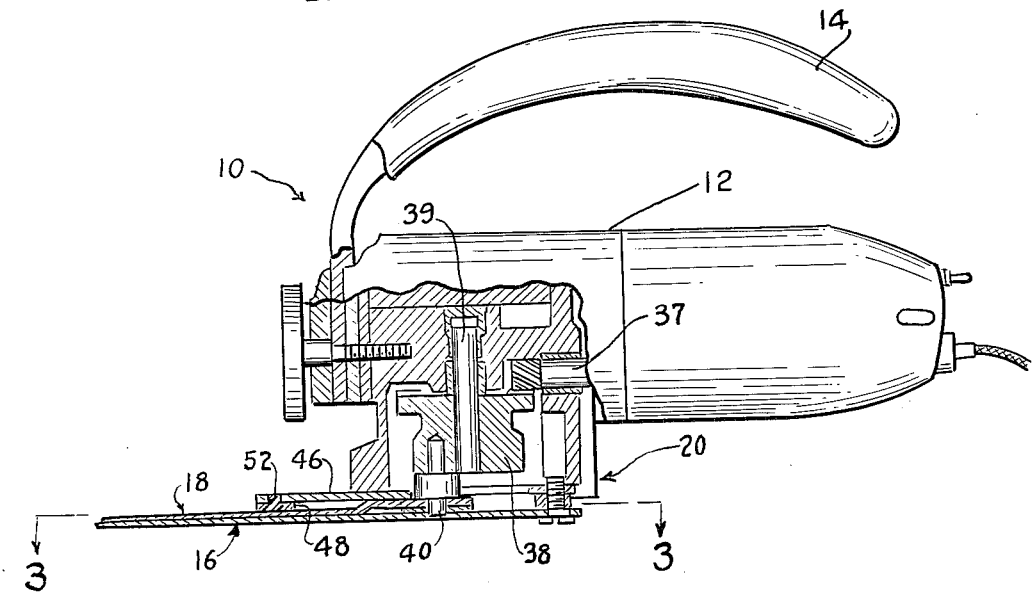
INVENTOR.
JOHN P. BRUCK
BY
ATTORNEYS 3,218,710
GRASS TRIMMERS
John P. Bruck, Toledo, Ohio, assignor, by mesne assignments, to The Singer Company, New York, N.Y., a corporation of New Jersey
Filed Feb. 28, 1963, Ser. No. 261,742
3 Claims. (Cl. 30—222)

This invention relates to grass trimmers and particularly to grass trimmers having an improved cutting action and an improved pressure member for maintaining effective contact between blades of the trimmer.

Garden or grass trimmers particularly for trimming grass around trees, next to buildings, etc. have found wide acceptance in recent years. A trimmer of this type generally includes stationary blades, oscillating blades moving in opposed relationship over the stationary blades, and a pressure plate for holding the oscillating blades against the stationary ones for effective cutting or shearing action. One problem with trimmers heretofore known is that they are vulnerable to contaminants, particularly abrasive particles in dirt, which cause rapid failure of the components. Failure usually results from excessive wear of the parts due to the abrasive action or from an overload on the drive motor which occurs as the particles enter between moving parts and increase friction. Specifically, the dirt usually lodges between the pressure plate and the moving blades and between the moving and stationary blades.

The present invention is based upon the discovery of an improved pressure member which overcomes the above disadvantage. The new pressure member includes a plastic pressure strip, preferably of slippery plastic material, which maintains low friction under all conditions and overcomes motor and blade failure caused by excessive friction. The plastic strip is inexpensive and is easily removable for replacement, yet is firmly held in place when in operating position.

The new trimmer also provides a pair of movable blade members, each having at least two blades thereon, which enable a better cutting action to be obtained with shorter oscillatory strokes.

Another principal object of this invention, is to provide a grass trimmer which permits obtaining a maximum cutting action in connection with minimum vibration.

It is, therefore, a principal object of the invention to provide a grass trimmer with an improved pressure member.

Another object of the invention is to provide grass trimmers with fewer motor failures and less frequent blade replacement.

Still another object of the invention is to provide a grass trimmer pressure plate employing a plastic strip for contact with the movable blades of the trimmer.

Yet another object is to provide a grass trimmer with an improved cutting action.

Other objects and advantages of the invention will be apparent from the following detailed description of a preferred embodiment thereof, reference being made to the accompanying drawing, in which:

FIG. 1 is a view in perspective of a grass trimmer embodying the invention;

FIG. 2 is a view in elevation, with parts broken away and with parts in cross section, of the trimmer of FIG. 1;

FIG. 3 is a plan view of stationary and movable blades employed in the trimmer of FIGS. 1 and 2;

FIG. 4 is an enlarged, fragmentary view in cross section, taken along the line 4—4 of FIG. 1; and FIG. 5 is a view in perspective of a plastic strip constituting part of the pressure plate of the trimmer.

Referring to the drawing, and more particularly to FIG. 1, a trimmer embodying the invention is generally indicated at 10 and includes a main body or housing 12, a handle 14, a stationary blade member 16, movable blade members 18, and a pressure plate member 20 which urges the movable blade members 18 against the stationary blade member 16.

In this instance, each of the movable blade members 18 includes two movable blades 22 and 24, each blade having two cutting edges 26 and 28. The stationary blade member 16 includes five blades, or one more than the number of movable blades, the outer two being designated 30 and the inner three designated 32. These stationary blades form four pair of opposed cutting edges 34 and 36. Each of the movable cutting blade members 18 provides two cutting actions during each stroke, with each stroke having a length only approximately equal to the distance between the adjacent stationary blades. The short oscillatory stroke thus provides maximum cutting action with minimum vibration. In FIG. 3, the blades at the outer extremity of the stroke are shown in solid lines and at the inner extremity of the stroke in dotted lines.

The movable blade members 18 can be oscillated through any suitable drive mechanism. As shown in FIGS. 2 and 3, a motor shaft 37 in this instance drives a ring gear meber 38 rotatable on an axle 39. A drive pin 40 is mounted in an eccentric position on the ring gear member 38 and extends downwardly therefrom, into slots 42 in rear portions of the blade members 18. The pin 40 causes the blade members 18 to oscillate about axles 44 as the pin 42 rotates with the gear member 38 in a circular path.

The pressure member 20 is necessary to urge the movable blade members 18 against the stationary blade member 16 to assure effective cutting action therebetween. The pressure member 20 includes a backing plate or element 46 (FIG. 4) and a plastic pressure strip or element 48. The strip 48 also includes three upwardly extending projections 50 which are securely frictionally held in three holes 52 in the front edge of the pressure plate 46. With this simple fastening arrangement, the strip 48 can be removed easily from the plate 46 when the stationary blade 16 and the movable blades 18 are removed and yet the strip 48 is held firmly in place when the blades 16 and 18 and the pressure member 20 are assembled. The strip 48 is arcuate to contact the movable blade members 18 at the same locations throughout the length of their strokes. The strip is also of uniform width to establish a uniform area of contact with the blade members 18.

The strip 48 is of a suitable plastic material which will maintain at a minimum the friction between the pressure strip 48 and the movable blade members 18. For this purpose, the plastic is preferably of a slippery or oily nature and can be of a slippery nylon known as Zytel 101, or of polytetrafluoroethylene, known as Teflon, for example, both being available from E. I. du Pont de Nemours & Company.

The plastic pressure strip 48 is substantially unaffected by dirt during operation, even when the trimmer 10 is occasionally poked into the ground. Even though a considerable amount of dirt thereby surrounds the blades 16 and 18, nevertheless, the pressure strip 48 continues to provide pressure on the movable blades 18 without an abrasive contact and without excessive friction. In trimmers heretofore known, with dirt on the blades, the metal pressure bars would grind against the top of the movable blade members, causing friction to rise rapidly and thereby overheating the motor and causing its rapid failure. The grinding action of the pressure bars on the movable blade members also caused wear on the rear portion of them and eventual failure thereof. Further, the metal pressure bars heretofore known had a tendency to warp during the manufacture thereof, as when heat-treated, or became bent during use, whereby the pressure exerted on the movable blades varied from one end of the pressure bars to the other. However, with the resiliency or yieldability of the plastic strip 48, pressure is maintained evenly, even though the pressure plate 46 should have a tendency to be slightly warped or bent.

Various modifications of the above described embodiment of the invention will be apparent to those skilled in the art, and it is to be understood that such modifications can be made without departing from the scope of the invention, if they are within the spirit and the tenor of the accompanying claims.

What I claim is:

1. A grass trimmer comprising a stationary blade member having a plurality of blades extending therefrom, a pair of movable blade members, drive means for oscillating said movable blade members across said stationary blade member, a pressure member urging said movable blade members against said stationary blade member, said pressure member including a backing element having a plurality of holes and a plastic pressure element associated therewith and located between said backing element and said movable blade members and being the sole source of pressure contact between said movable blade members and said pressure member, said plastic pressure element including a plurality of projections corresponding to the plurality of holes in said backing element, thereby removably retaining said backing element and said pressure element in fixed relationship by engagement of said projections within said holes of said backing element.

2. A trimmer according to claim 1 wherein said plastic pressure element is arcuate and of uniform width throughout its length.

3. A grass trimmer comprising a pair of movable blade members each having blades extending therefrom with the number of blades on one member being the same as the number on the other member, a stationary blade member having a number of blades extending therefrom which equals at least one more than the number of movable blades, drive means for oscillating said movable blade members in opposed relationship and moving said movable blades across said stationary blades with the stroke of said movable blade members being substantially equal to the distance between any adjacent pair of stationary blades, a pressure member urging said movable blade members against said stationary blade member, said pressure member including a backing element having a plurality of holes and a plastic pressure element associated therewith and located between said backing element and said movable blade members and being the sole source of pressure contact between said movable blade members and said pressure member, said plastic pressure element including a plurality of projections corresponding to the plurality of holes in said backing element thereby removably retaining said backing element and said pressure element in fixed relationship by engagement of said projections within said holes of said backing element.

References Cited by the Examiner

UNITED STATES PATENTS

| 437,515 | 9/1890 | Renz | 30—221 |
| 540,848 | 6/1895 | Allen | 30—221 |
| 636,146 | 10/1899 | Hume | 30—221 X |
| 1,501,737 | 7/1924 | Allin | 30—225 X |
| 3,049,802 | 8/1962 | Bork | 30—221 X |
| 3,052,025 | 9/1962 | Ring | 30—221 |

FOREIGN PATENTS

| 1,117,360 | 2/1956 | France. |
| 786,505 | 11/1957 | Great Britain. |

WILLIAM FELDMAN, *Primary Examiner.*

M. HENSON WOOD, JR., MILTON S. MEHR,
*Examiners.*